Figure 1:
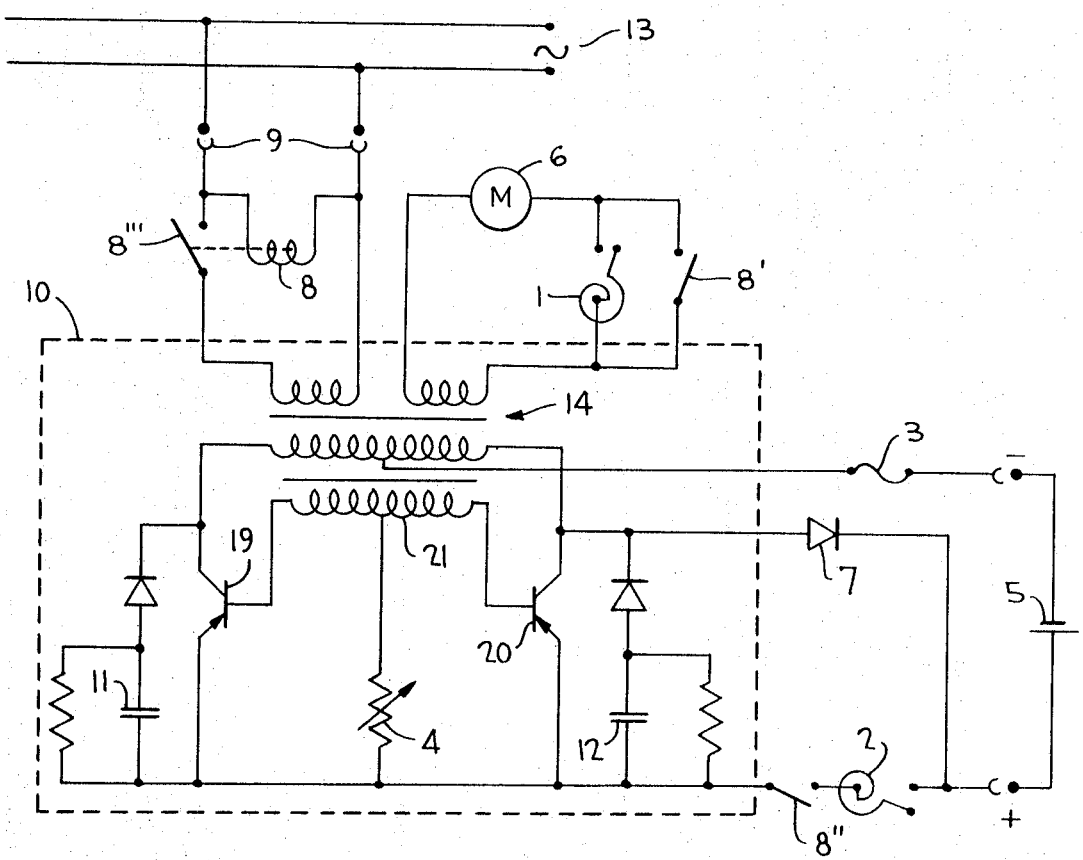

United States Patent

[11] 3,614,535

| [72] | Inventor | Konstantin Apel |
| | | Meersburg, Germany |
| [21] | Appl. No. | 13,934 |
| [22] | Filed | Feb. 25, 1970 |
| [45] | Patented | Oct. 19, 1971 |
| [73] | Assignee | Holzer Patent AG |
| | | Zug, Switzerland |
| [32] | Priority | Feb. 26, 1969 |
| [33] | | Germany |
| [31] | | P 19 09 746.2 |

[54] VOLTAGE TRANSFORMER
8 Claims, 2 Drawing Figs.

[52] U.S. Cl. .................................................... 317/40 A,
307/66, 317/43, 317/52, 320/40

[51] Int. Cl. ........................................................ H02h 5/04
[50] Field of Search ........................................... 307/66;
320/25, 26, 39, 40; 317/40 A, 43, 52

[56] References Cited
UNITED STATES PATENTS

| 3,356,922 | 12/1967 | Johnston | 320/40 X |
| 3,419,730 | 12/1968 | Cox | 307/66 |

*Primary Examiner*—James D. Trammell
*Attorney*—Watson, Cole, Grindle & Watson

ABSTRACT: A device and electric circuit to supply a voltage to a consumer with means to switch over from a network to battery-powered operation.

3,614,535

PATENTED OCT 19 1971

INVENTOR,
KONSTANTIN APEL

BY Watson, Cole, Grindle & Watson
ATTORNEYS 3,614,535

VOLTAGE TRANSFORMER

This invention relates to a voltage transformer, for example for use in cooling devices for network and battery operation.

Voltage transformers have been known in various designs and they serve for example, for the purpose of supplying a higher DC voltage from a relatively low one. If the DC voltage originates from a battery or accumulator, then as a rule means are provided for the periodic recharging of the battery. It is necessary for the recharging to switch over known devices manually. It is true that standby sets are known which accomplish the switchover from the network to battery operation automatically, but the cost of these installations cannot be justified in the case of domestic devices.

Therefore it is an object of the invention to create a device which makes it possible with relatively simple means to operate a load, for example a motor from the network, and upon failure of the network to supply it without interruption from battery. Besides, one must be sure that the battery is constantly maintained in a charged state. It is therefore a further object according to the invention to provide means for switching over from the network to battery operation and vice versa, in that the battery in the case of network operation is connected to a charging circuit and that for charging of the battery, the elements of a protective circuit are used.

The voltage transformer has the advantage that it is built up with exceedingly few individual elements and that, therefore, it can be produced very inexpensively. As a result of the electronic circuit in accordance with this invention, the switching over from the network to battery operation and vice versa is accomplished with the greatest safety either automatically or manually. Since individual elements of the device fulfill double functions, it operates with few individual parts.

One embodiment of the invention provides a relay, connected to the input of the network of a transformer, which contains at least one operating contact and one normally closed contact. It is particularly effective if he transformer is connected with the network by means of the operating contact of the relay.

A further object of the invention resides in that a motor connected with the transformer can be switched on through an additional normally closed contact of the relay or by means of he contact of a thermostat. According to a further embodiment of the invention, he voltage transformer can be switched to the battery by means of a normally open contact of the relay and by contact of the thermostat.

For the protection of the electronic circuit against a DC voltage which is improperly polarized and which originates from the battery, a fuse is connected between the voltage transformer and the battery which disconnects the erroneously polarized battery circuit; and a diode is provided that is connected in such a way that it will close the wrongly polarized circuit by means of the fuse.

Two capacitors of the voltage transformer which serve for the purpose of suppressing voltage peaks, have capacitances of different magnitude in order that the voltage transformer will start oscillating.

According to a further development of the invention, the relay located at the input to the network of the transformer contains at least three operating contacts and three normally closed contacts. A practical design of the invention provides that the diode is used as a charging rectifier.

Figure 2:
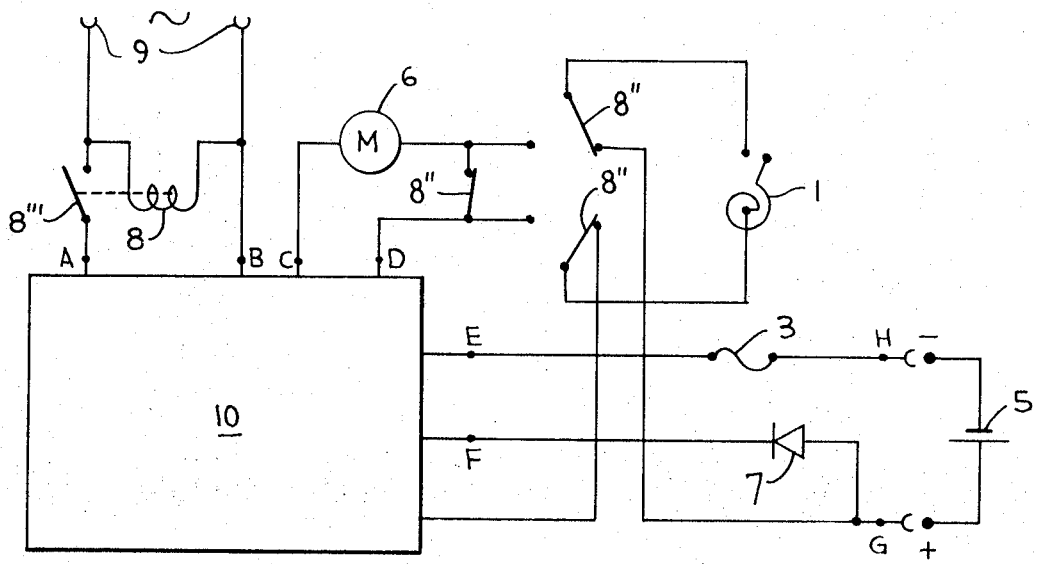

Further objects of the invention will be apparent from the following description when considered in connection with the accompanying drawing in which;

FIG. 1 is a circuit diagram showing a voltage transformer circuit which operates with two thermostats, and FIG. 2 is a circuit diagram showing a voltage transformer circuit with only one thermostat.

A motor 6, which is for example swinging lever motor or an AC motor, serves for the purpose of producing low temperatures in a refrigerating device, for example a deep freezer in connection with a compressor. This motor 6 can be kept in operation either by means of terminals 9 from a supply network 13, for example 220 v., or by a battery 5, FIG. 1. If the device shown in FIG. 1 is connected to a supply network 13, then relay coil 8 will be energized and will close a relay operating contact 8'''. Simultaneously, additional relay contacts 8' and 8'', normally closed contacts, are opened. A thermostat 1, connected within the circuit of the motor 6, keeps this circuit closed prior to putting the installation into operation, for which reason motor 6 obtains a voltage from the supply network 13 by means of transformer 14 whenever the installation is connected with the network 13. The motor 6 runs until the proper low temperature has been reached and the contact of the thermostat 1 interrupts the circuit of the motor. As long as the supply network 13 supplies voltage to the transformer 14, a battery 5 is charged by means of said transformer as well as a fuse 3 and a rectifier 7.

If the supplying network 13 does not, for any reason, supply power or energy, then relay 8 drops out, its operating contact 8''' is opened and its two open contacts 8' and 8'' will close. If in this state, a thermostat 2 will still indicates a temperature which is so low that it will suffice to keep the contact opened, then the installation is at a standstill. If on the other hand in he case of a rising temperature, the contact of the thermostat 2 is closed, then the battery 5 will place a voltage transformer 10 into operation by means of the fuse 3 and the closed contact of the thermostat 2 as well as the closed contact 8'' of the relay 8. Said transformer produces an AC voltage which is transferred by the transformer 14 and reaches the motor 6 by means of the closed contact 8' of the relay 8.

Whenever the two thermostats 1 and 2 are set for different temperatures, relay contact 8' can be omitted. This solution has turned out to be highly practical, since in the case of normal (as described above) network operation a relatively low temperature is maintained and in the case of failure of the network, the cooled material will not spoil even if the cooling temperature is not quite as low as obtained in the case of a network operation.

If the battery 5 has been connected to the voltage transformer 10 by means of the improper or wrong terminals, then a safety circuit for the voltage transformer becomes effective. A current of sufficient magnitude will flow by means of a rectifier 7, a partial winding of the transformer 14 and through a fuse 3, so that the latter interrupts the circuit. The rectifier 7 is also during normal operation of the circuit used as a charging rectifier for charging the battery 5.

The voltage transformer 10, in the present embodiment presented by way of example, FIG. 1, contains semiconductors 19 and 20 as active elements, whose collectors are coupled with one another by means of a transformer 14. The bases of the two transistors 19 and 20 are connected with one another by an additional winding 21 of the transformer 14 whose center tap is adjusted to zero voltage by a variable base resistance 4. The voltage transformer 10 contains among other elements, two capacitors 11 and 12 of different capacitance and may comprise, for example, an electrolytic capacitor which requires only a small space, and are connected with the collectors of the transistors 19 and 20 by diodes. The diodes as well as the resistances lying in parallel with the capacitors may be omitted in the case of foil capacitors or bipolar capacitors. They serve for the purpose of suppressing voltage peaks on the collectors of the two transistors 19 and 20. Moreover on the basis of their different charge voltage, they ensure initial oscillation of the circuit.

The device illustrated in FIG. 2 operates, in principle, in the same way as that in FIG. 1, but it uses only one thermostat. In the case of battery operation, the contacts are in the position shown, that is to say, contact 8''' of the relay 8 are open, three contacts 8'' are closed. If the contact of thermostat 1 is also closed, then it becomes clear without difficulty from FIG. 2 that the voltage transformer 10 obtains DC voltage from the battery 5, for example, an accumulator. If on the other hand, the device is supplied from the network by terminals 9, then the relay 8 is energized which causes contact 8''' to close, and the three closed contacts 8'' are opened. In this manner the motor 6 is connected with the electric network by transformer 14 (in network 10 of FIG. 1) of the voltage transformer 10. In that case, the rectifier 7 acts exactly as in FIG. 1 in connection with the fuse 3 as a protection against improper polarity connection of the battery.

In the case of the circuit according to FIG. 2, one of the closed contacts 8'' is used for the purpose of closing the circuit of the motor 6 in the case of battery operation. This contact may be omitted if the motor 6 is connected directly to one side of the battery.

I claim:

1. A voltage transformer circuit for providing an AC output to a load, comprising:
   an AC power source,
   a voltage transformer having split primary and secondary windings,
   means for connecting one of said split primary windings to said AC source only when said AC source is energized, the other of said split primary windings is connected to said load,
   a DC source,
   an oscillator for interconnecting said secondary windings to one pole of said DC source,
   said means for connecting also including means for interconnecting the other pole of said DC source to said oscillator,
   and means for charging said battery connected to said secondary windings,
   whereby said AC output is obtained from said AC source through said transformer and said DC source is charged from said split secondary windings and said AC output is alternatively obtained from said battery, oscillator and said transformer when said AC is deenergized.

2. A voltage transformer circuit as in claim 1 wherein said means for charging includes means for disconnecting said battery from said oscillator and said secondary windings if said one pole and said other pole connections are interchanged.

3. A voltage transformer circuit as in claim 2 wherein said means for connecting is a relay having an operating coil connected to said AC source and at least two operating contacts for respectively connecting said one split winding to said AC source and connecting said other pole of said DC source to said oscillator.

4. A voltage transformer circuit as in claim 3 further comprising temperature-sensitive switch means for connecting and disconnecting said load to said other of said split primary windings.

5. A voltage transformer circuit as in claim 4 wherein said means for connecting further includes an additional temperature-sensitive switch means interposed between said DC source and said oscillator.

6. A voltage transformer circuit as in claim 2 wherein said means for disconnecting said DC source includes a fuse connected between said one pole and said secondary winding and a diode connected between said other pole and said secondary winding, said diode is forward biased to conduct with said pole and said other pole interchanged to activate said fuse.

7. A voltage transformer circuit as in claim 6 wherein said diode conducts to charge said battery 8. A voltage transformer circuit as in claim 1 wherein said oscillator includes at least two active components interconnected by said secondary windings and a respective capacitor connected to each of said at least two active components to suppress voltage peaks, said capacitors having different capacitance values to initiate operation of said oscillator.